No. 771,935. PATENTED OCT. 11, 1904.
H. L. REYNOLDS.
NUT LOCK.
APPLICATION FILED APR. 7, 1902.
NO MODEL.

Witnesses.
Barbara Lamber
H. L. Beil

Inventor.
Henry L. Reynolds

No. 771,935.

Patented October 11, 1904.

UNITED STATES PATENT OFFICE.

HENRY L. REYNOLDS, OF BROOKLYN, NEW YORK.

NUT-LOCK.

SPECIFICATION forming part of Letters Patent No. 771,935, dated October 11, 1904.

Application filed April 7, 1902. Serial No. 101,652. (No model.)

*To all whom it may concern:*

Be it known that I, HENRY L. REYNOLDS, a citizen of the United States, and a resident of the city of New York, borough of Brooklyn, county of Kings, and State of New York, have invented a new and Improved Lock-Nut, of which the following is a full, clear, and exact description.

My invention relates to improvements in lock-nuts or means by which nuts may be prevented from becoming gradually loosened by use, and comprises the novel features which will be hereinafter described, and particularly pointed out in the claims.

The drawings accompanying herewith illustrate my invention in forms which are now preferred by me.

Figure 1:
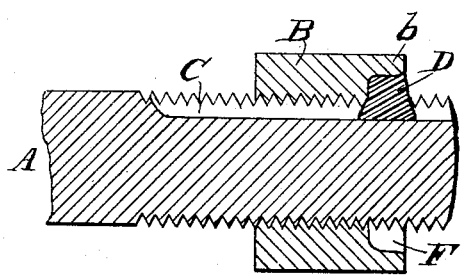
Figure 2:
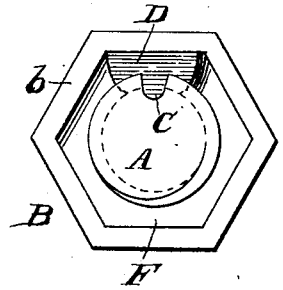
Figure 6:
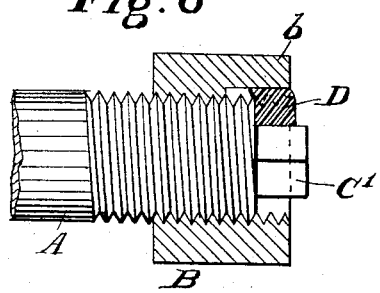
Figure 7:
Figure 3:
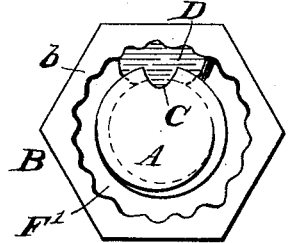
Figure 5:
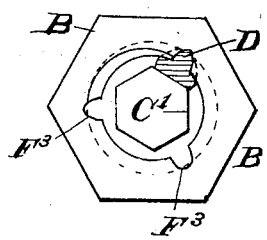
Figure 4:
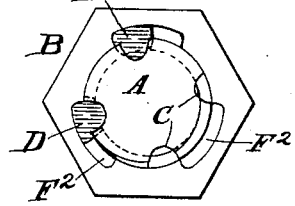

Figure 1 is a longitudinal section of a bolt and nut constructed in accordance with my invention. Fig. 2 is an end view of the same bolt and nut. Figs. 3, 4, and 5 are end views of modified forms of my invention. Fig. 6 is a longitudinal section of a bolt and nut such as shown in Fig. 5; and Fig. 7 is an end view of a form to which the locking plug or key may be shaped, if desired.

In carrying out my invention I form the bolt and nut so that the threaded portion of the bolt, which is engaged by the nut, and a portion at least of the opening in the nut are non-circular in outline, the non-circular portions of bolt and nut being capable of being brought opposite, so as to form a recess within which may be inserted a plug or key, of ductile metal or equivalent material, which may then be expanded by pressure, so that it is forced into close contact with the walls of the recess, preferably including as a part thereof the threads of the bolt, so that it is impossible to remove the plug or turn the nut upon the bolt without deforming or shearing the plug.

The term "non-circular" as herein used is intended to define a surface or surfaces which are not generated by the revolution of surfaces having the axis of the bolt as their axis of rotation. This term is intended to apply to the bottom wall of the recess in the nut as well as to the peripheral wall of said recess.

In Figs. 1, 2, and 3 the bolt A is shown as having a single longitudinal groove C extending substantially throughout the extent of the threaded portion thereof, the same being the method preferred by me for securing the necessary non-circular outline of the bolt. This may, however, extend beyond the threads or over only a part of the threaded portion, the essential thing being that there should be a groove or other equivalent formation which makes the bolt non-circular at the point corresponding with the location of the non-circular part of the nut when it is in the position in which it is desired to lock it. This groove is in all cases herein shown as extending slightly below the base of the threads, which, although preferable, is not essential. A single groove may be used, as is shown in Figs. 1, 2, and 3, or a plurality of grooves, as in Fig. 4.

In Figs. 1 and 2 the nut B is shown as having a recess F formed in its outer face by the flange $b$, said recess corresponding in shape with the shape of the outside of the nut, which in this case is shown as hexagonal. The shape of this recess is, however, not the essential thing except that its surfaces should not be surfaces of revolution having the axis of the bolt as their axis, but should have projections or irregularities adapted to be engaged by the plug to prevent the nut turning about the plug. In Fig. 3 the same result is secured by making the outer wall of the recess F' of an irregular or wavy circular outline. The particular manner in which the irregularities of its outline are secured is immaterial. When the nut has reached the position in which it is desired to lock it, a plug D of any suitable material which will expand or flow under pressure is inserted in the recess F opposite the groove C and is then expanded or caused to flow by the blow of a hammer or the use of a punch until it spreads and closely fills the adjacent portion of the recess, including the groove C and preferably short portions of the threads of the bolt on each side of the groove. The entrance of the plug in the groove C prevents rotation of the plug about the bolt and the non-circular character of the outer wall of the recess F prevents rotation of the nut about the plug, while its engagement with the threads of the bolt prevents its being pulled out or moved lengthwise the bolt. The plug may be made of any material which will flow under pressure, so as to fill the groove and threads, but preferably of such soft metals as lead, zinc, copper, alloys, or even of soft iron or steel. The particular metal or combination of metals to be employed will depend upon the degree of security desired in any case, the severity of the service, and the ideas of the person in charge. In some cases, if desired, the material of which the plug is formed may be melted and poured into place, although generally this would be neither desirable nor practicable.

In Fig. 4 a form is shown in which there are a plurality of grooves C in the bolt and a plurality of recesses $F^2$ in the nut, the latter extending only part of the way about the nut and each being separated from the adjacent ones by a section of the nut of normal thickness. I have shown the number of grooves in the bolt as differing by one from the number of recesses in the nut, by reason of which at least one of the recesses is at all times opposite a groove, and the nut may thus be locked in any position. By making the recesses of sufficient extent two plugs may be employed, as is shown in Fig. 4.

In Figs. 5 and 6 is shown a form which in one sense is a reversal of that shown in Figs. 1 and 2. In Figs. 5 and 6 the groove $F^3$ is formed in the nut and a short section C' of the end of the bolt is made of non-circular outline. I have also shown herein the use of a plurality of grooves, which may also be employed with the form shown in Figs. 1 and 2, if desired.

In Fig. 7 is shown a shape of plug which has a rib $d$ formed thereon before insertion and adapted to enter the groove in the bolt. This may in some cases be desirable, but is not a necessity, as the plug may be readily expanded so as to fill the groove whatever its original shape.

The plug may, if desired, be made as a ring which fits over the end of the bolt and within the recess in the face of the nut, in which case it may be made to wholly fill the recess when expanded into place. This would chiefly be advantageous in improving the appearance of the completed assemblage.

The groove in the bolt may be pressed therein when the bolt is made and will not add to its cost. Similarly the recess in the nut may be produced by stamping in the same operation by which the nut is made and will add nothing to the cost of the nut except the slight additional weight of metal required.

In using my lock-nut the nut is turned up to the point desired whatever that may be and without reference to bringing any part thereof into registry with any part of the bolt. A plug is then inserted opposite the groove in the bolt and expanded by the use of a punch or any other convenient device until it expands into the groove and threads of the bolt and into close contact with the wall of the recess in the nut. When it is desired to remove the nut, this may be done by placing a wrench on the nut and applying power to it until that portion of the plug lying within the groove is sheared from the remainder. If the hardness of the material of the plug has been rightly gaged, this may be readily done, and yet the plug be sufficiently hard to prevent the nut from working loose by service. When it is desired to replace the nut, the same plug may be used over again, if desired.

The construction of this lock-nut is such that it adds no appreciable amount to the cost of bolt or nut and is so simple that it may be understood and properly used by the commonest laborer. It is also capable of being locked in any position on the bolt and of being removed and replaced or readjusted as often as need be. It does not materially enlarge or weaken either nut or bolt nor does it have any movable or small parts which are likely to become injured or lost. Neither is it necessary in manufacturing it to employ costly or complicated processes or machinery or that the workmanship be any more accurate than is customary in similar work.

Having thus fully described my invention, I claim as new and desire to secure by Letters Patent—

1. The combination with a bolt having a longitudinal groove, of a nut having a non-circular recess extending inwardly from its outer face and outwardly from its bore, and a locking-plug of expandible metal adapted to be inserted within said recess and expanded by pressure against the walls of the recess and into said groove after the nut has been set up.

2. The combination with a bolt having a longitudinal groove of a nut having a non-circular recess in its outer face extending entirely around its bore, and a locking-plug of expandible metal adapted to be inserted within said recess and expanded by pressure against the walls of the recess and into said groove, after the nut has been set up.

3. The combination with a bolt having a longitudinal groove within its threaded portion, of a nut having a recess extending from its outer face inwardly and from its bore outwardly, the outer or peripheral wall of said recess being non-circular in outline and not undercut, said recess being adapted to receive a locking plug or key of a ductile metal which by pressure may be expanded into said groove and recess to lock bolt and nut against turning.

In testimony whereof I have hereunto signed my name in the presence of two subscribing witnesses.

HENRY L. REYNOLDS.

Witnesses:
BARBARA CAMBEIS,
HUGO LOUIS BEIL.